United States Patent
Tu

(10) Patent No.: US 9,094,357 B2
(45) Date of Patent: Jul. 28, 2015

(54) COMMUNICATION SYSTEM, MASTER DEVICE, AND COMMUNICATION METHOD

(71) Applicant: Nuvoton Technology Corporation, Hsinchu (TW)

(72) Inventor: Yu-Hui Tu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 271 days.

(21) Appl. No.: 13/831,968

(22) Filed: Mar. 15, 2013

(65) Prior Publication Data
US 2014/0207879 A1   Jul. 24, 2014

(30) Foreign Application Priority Data

Jan. 22, 2013  (TW) .............................. 102102386 A

(51) Int. Cl.
*H04B 1/7156* (2011.01)
*H04L 12/58* (2006.01)
*H04B 1/713* (2011.01)
*H04W 56/00* (2009.01)

(52) U.S. Cl.
CPC ................ *H04L 51/30* (2013.01); *H04B 1/713* (2013.01); *H04W 56/00* (2013.01)

(58) Field of Classification Search
CPC .... H04B 1/713; H04B 1/7136; H04B 1/7156; H04B 1/7143

USPC .................................. 375/132, 134, 137, 356
See application file for complete search history.

(56) References Cited

U.S. PATENT DOCUMENTS

| | | | |
|---|---|---|---|
| 5,414,731 A | 5/1995 | Antunes et al. | |
| 8,054,864 B2 * | 11/2011 | Keshavarzian et al. | 375/130 |
| 8,428,101 B1 * | 4/2013 | Sarca et al. | 375/133 |
| 2011/0122980 A1 * | 5/2011 | Bradshaw | 375/356 |
| 2012/0093243 A1 * | 4/2012 | Okada et al. | 375/259 |

OTHER PUBLICATIONS

"Office Action of Taiwan Counterpart Application," issued on Feb. 4, 2015, p. 1-p. 6.

* cited by examiner

*Primary Examiner* — Kevin Kim
(74) *Attorney, Agent, or Firm* — Jianq Chyun IP Office

(57) ABSTRACT

A communication system, a master device, and a communication method are provided. The communication system includes a master device and at least one slave device. The master device periodically sends a plurality of synchronous messages at intervals of a first predetermined time. The at least one slave device respectively receives the corresponding synchronous messages via wireless communication. The master device and the at least one slave device synchronously switch an operating frequency of wireless communication according to a frequency table.

17 Claims, 8 Drawing Sheets ered herein and made a part of this specification.

COMMUNICATION SYSTEM, MASTER DEVICE, AND COMMUNICATION METHOD

CROSS-REFERENCE TO RELATED APPLICATION

This application claims the priority benefit of Taiwan application serial no. 102102386, filed on Jan. 22, 2013. The entirety of the above-mentioned patent application is hereby incorporated by reference herein and made a part of this specification.

BACKGROUND OF THE INVENTION

1. Field of the Invention

The invention generally relates to a communication technique, and more particularly, to a communication system capable of switching an operating frequency, a master device, and a communication method.

2. Description of Related Art

Wireless communication technology has been broadly applied to different fields along with the development thereof. Generally, if an electronic device A is about to communicate with an electronic device B in a wireless manner, the electronic device A and the electronic device B have to have the same operating frequency. However, noises are everywhere and these noises always interfere with the operating frequencies of wireless communications. Thus, if a fixed operating frequency is used, the communication quality will be reduced due to the interference of noises.

A frequency hopping mechanism can be adopted for enhancing the anti-noise capability of an electronic device in wireless communication. The operation principle of the frequency hopping mechanism is to constantly switch the operating frequency of a plurality of electronic devices in wireless communication to enhance the anti-noise capabilities of the electronic devices. However, the frequency hopping mechanism comes with many limitations. For example, if an electronic device A is about to hop frequencies with both an electronic device B and an electronic device C, the electronic device A has to send frequency hopping information, such as when to hop the frequency and the destination operating frequency, to the electronic device B and the electronic device C frequently. The more often the operating frequency is switched, the more frequently the electronic device A has to communicate with the electronic device B and the electronic device C. Additionally, the frequency hopping information may not be successfully transmitted if the wireless communication quality is not satisfactory.

SUMMARY OF THE INVENTION

An embodiment of the invention provides a communication system. The communication system includes a master device and at least one slave device. The master device periodically sends a plurality of synchronous messages at intervals of a first predetermined time. The at least one slave device respectively receives the corresponding synchronous messages via wireless communication. In addition, the master device and the at least one slave device synchronously switch an operating frequency of wireless communication according to a frequency table.

An embodiment of the invention provides a master device adapted to a communication system. The master device includes a processing unit, a memory unit, and a communication unit. The processing unit generates a plurality of synchronous messages. The memory unit is coupled to the processing unit and stores a frequency table. The communication unit is coupled to the processing unit and the memory unit. The communication unit periodically sends the synchronous messages to at least one slave device in the communication system at intervals of a first predetermined time in wireless communication. The processing unit switches an operating frequency of wireless communication of the communication unit according to the frequency table.

An embodiment of the invention provides a communication method adapted to a master device in a communication system. The communication method includes following steps. A plurality of synchronous messages is generated. The synchronous messages are periodically sent to at least one slave devices in the communication system at intervals of a first predetermined time in wireless communication. An operating frequency of wireless communication is switched according to a frequency table.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
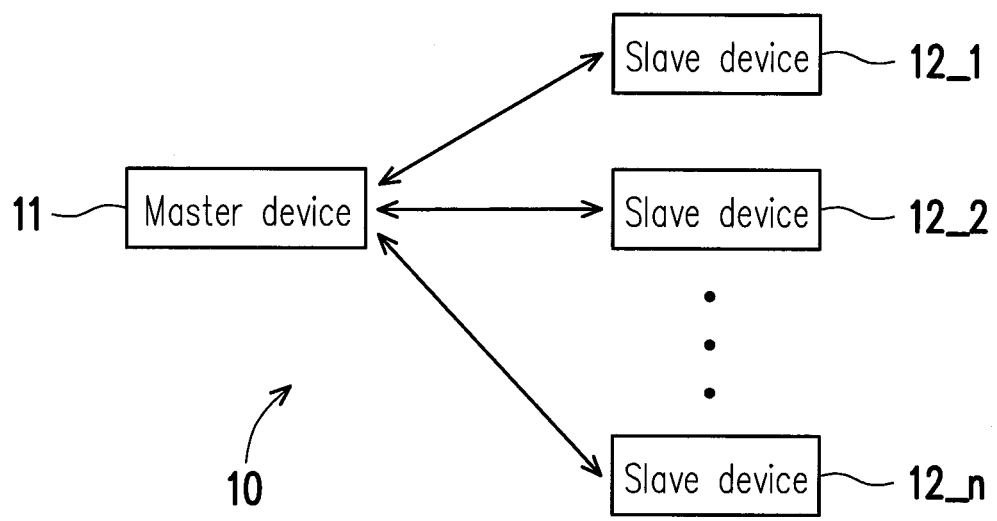
FIG. 1 is a diagram of a communication system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

An embodiment of the invention provides a communication system. In the communication system, a master device and a plurality of slave devices can periodically and synchronously update an operating frequency of wireless communication according to their own frequency tables. In addition, the master device of the communication system can periodically send a plurality of synchronous messages to the slave devices of the communication system, so that each slave device can get to know whether to update its frequency table according to the received synchronous message.

Moreover, each slave device can start using a new frequency table according to a countdown time stamp in the received synchronous message or through a countdown procedure executed by the slave device. Accordingly, operating frequency synchronization can be effectively accomplished between a master device and a plurality of slave devices even in a network environment with unsatisfactory communication quality. On the other hand, embodiments of the invention also provide a master device adapted to aforementioned communication system and a corresponding communication method. Embodiments of the invention will be described below with reference to accompanying drawings.

FIG. 1 is a diagram of a communication system according to an embodiment of the invention. Referring to FIG. 1, the communication system 10 includes a master device 11 and slave devices 12_1-12_n. In the present embodiment, the master device 11 and the slave devices 12_1-12_n can communicate with each other in wireless communication. Particularly, the master device 11 can periodically send a plurality of synchronous messages to the slave devices 12_1-12_n at intervals of a first predetermined time (or referred to as a polling time (for example, between 0.5 and several microseconds)). Besides, the slave devices 12_1-12_n respectively receive the corresponding synchronous messages and send acknowledgement messages corresponding to the synchronous messages to the master device 11. In the present embodiment, the master device 11 may be a transceiver of a wireless microphone and the slave devices 12_1-12_n may be wireless microphones. Also, it is noted that the amount of slave devices differs according to actual situations, for example, the amount of slave devices can be only 1 (i.e. n=1) in some circumstances, but the invention is not limited thereto.

In the present embodiment, wireless communication may be a 3G, Bluetooth, General Packet Radio Service (GPRS), High Speed Downlink Packet Access (HSDPA), High Speed Uplink Packet Access (HSUPA), Radio Frequency Identification (RFID), Wireless-Fidelity (Wi-Fi), 3GPP Long Term Evolution (3GPP LTE) wireless communication, or a combination thereof. However, the invention is not limited thereto.

In the present embodiment, the master device 11 and the slave devices 12_1-12_n periodically and synchronously switch an operating frequency of wireless communication according to their own frequency tables. Thus, even when the slave devices 12_1-12_n cannot successfully connect to the master device 11 due to unsatisfactory network condition or any other factor, the slave devices 12_1-12_n can still periodically switch the operating frequency according to their own frequency tables, so as to achieve the optimal communication quality.

Below, the operations of a communication system provided by an embodiment of the invention will be explained in detail respectively from the angle of the master device in the communication system (for example, the master device 11) and the angle of slave devices in the communication system (for example, the slave devices 12_1-12_n).

By viewing from the angle of the master device, in the present embodiment, the system state of the master device may be a synchronous message preparation state, a synchronous message transmission waiting state, and an acknowledgement message waiting state. In each of aforementioned states, the master device can execute a procedure or action corresponding to its current state. In addition, the master device can transform between each of aforementioned states at least once to complete asynchronous message transceiving procedure between the master device and a slave device (for example, the slave device 12_1).

Referring to FIG. 1 again, taking a synchronous message transceiving procedure between the master device 11 and the slave device 12_1 as an example, when the master device 11 is in the synchronous message preparation state, the master device 11 executes a synchronous message preparation procedure to prepare a synchronous message to be sent to the slave device 12_1. In the synchronous message transmission waiting state, the master device 11 waits for the predetermined time to transmit the synchronous message (for example, after one or several microseconds since a previous synchronous message is sent), and when it's time for sending the synchronous message, the master device 11 sends the synchronous message previously prepared in the synchronous message preparation procedure to the slave device 12_1. In the acknowledgement message waiting state, the master device 11 executes an acknowledgement message management procedure to wait for and process an acknowledgement message sent by the slave device 12_1 in response to the synchronous message.

Figure 2:
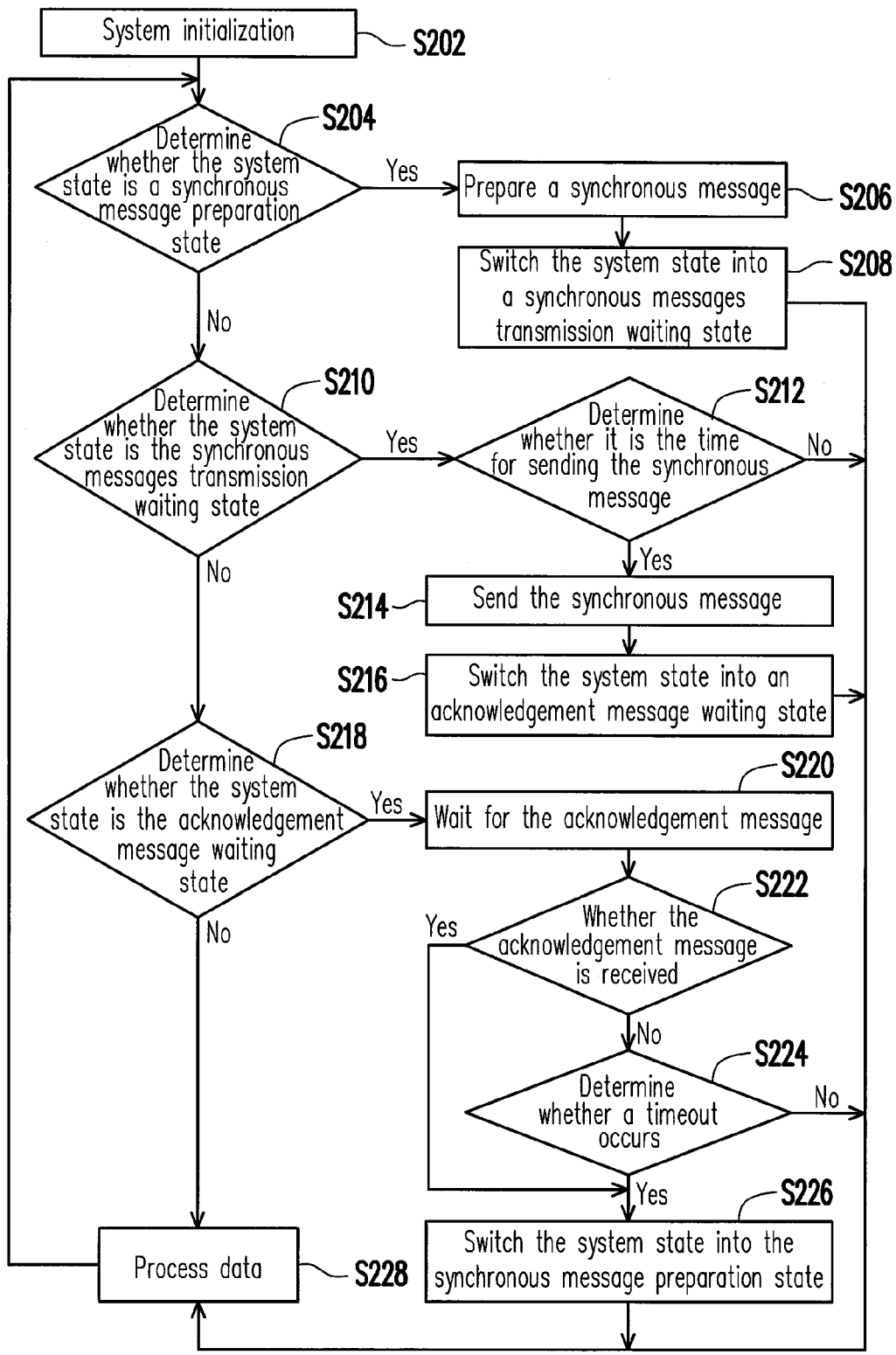
FIG. 2 is a flowchart of a synchronous message transceiving procedure of a master device according to an embodiment of the invention.

FIG. 2 is a flowchart of a synchronous message transceiving procedure of a master device according to an embodiment of the invention. It should be noted that the present embodiment is described by referring to the synchronous message transceiving procedure between the master device 11 and the slave device 12_1, as illustrated in FIG. 1.

Referring to FIG. 1 and FIG. 2, first, when the master device 11 is powered on or reset, in step S202, the master device 11 executes a system initialization procedure to set up related system parameters (for example, network parameters). Then, in step S204, the master device 11 determines whether its current system state is the synchronous message preparation state. If the current system state of the master device 11 is the synchronous message preparation state, step S206 is executed after step S204, in which the master device 11 executes a synchronous message preparation procedure to prepare a synchronous message to be sent to the slave device 12_1. After the synchronous message preparation procedure is completed or the synchronous message is prepared, in step S208, the master device 11 switches its system state to the synchronous messages transmission waiting state.

On the other hand, if the master device 11 determines in step S204 that the current system state of the master device 11 is not the synchronous message preparation state, step S210 is executed after step S204, in which the master device 11 determines whether its current system state is the synchronous messages transmission waiting state. If the current system state of the master device 11 is the synchronous messages transmission waiting state, step S212 is executed, in which the master device 11 determines whether it is time for sending the synchronous message. For example, the master device 11 may calculate the interval between the system time at which a previous synchronous message is sent and the current system time, and if the interval is equal to a predetermined transmission interval, the master device 11 determines that it is already time for sending the synchronous message and sends the synchronous message. Or, the master device 11 may also determines whether the current system time is one of a plurality of predetermined synchronous message transmission time through table lookup, and if the current system time is one of the predetermined synchronous message transmission time, the master device 11 sends the synchronous message.

If the master device 11 determines in step S212 that it is already time for sending the synchronous message, in step S214, the master device 11 sends the synchronous message prepared in the synchronous message preparation procedure to the slave device 12_1. Next, in step S216, the master device 11 switches its system state to the acknowledgement message waiting state. Besides, if the master device 11 determines in step S212 that it is not yet time for sending the synchronous message, step S228 is executed after step S212.

In addition, if the master device 11 determines in step S210 that its current system state is not the synchronous message transmission waiting state, step S218 is executed after step S210, in which the master device 11 determines whether its current system state is the acknowledgement message waiting state. If the current system state of the master device 11 is the acknowledgement message waiting state, in step S220, the master device 11 waits for an acknowledgement message corresponding to the synchronous message previously sent by the master device 11 and executes an acknowledgement message management procedure. After executing the acknowledgement message management procedure, in step S222, the master device 11 determines whether the acknowledgement message is received. If the acknowledgement message is received, step S226 is executed after step S222, in which the master device 11 switches its system state to the synchronous message preparation state. In addition, if the master device 11 determines in step S222 that the acknowledgement message is not received, in step S224, the master device 11 determines whether a timeout occurs, for example, the master device 11 has been waiting for the acknowledgement message for a time longer than a predetermined waiting time (for example, 0.5 to several microseconds). If a timeout occurs, the master device 11 stops waiting for the acknowledgement message and executes step S226.

On the other hand, if the master device 11 determines in step S218 that its current system state is not the acknowledgement message waiting state, or the master device 11 determines in step S224 that no timeout occurs, step S228 is executed after step S218 or step S224. In step S228, the master device 11 can process any data. For example, the master device 11 can process data to be added to a next synchronous message or data in the acknowledgement message received from any slave device. However, the invention is not limited thereto. Additionally, step S228 is executed after steps S208, S216, and S226. Moreover, step S204 can be executed again after step S228, in which the master device 11 executes the next synchronous message transceiving procedure or a synchronous message transceiving procedure regarding another slave device (for example, the slave device 12_2). However, the execution sequence of steps S204, S210, S218, and their following steps are not limited in the present embodiment.

In the present embodiment, the master device 11 sequentially executes the synchronous message transceiving procedures between the master device 11 and all the slave devices 12_1-12_n. After the master device 11 completes all the synchronous message transceiving procedures with the slave devices 12_1-12_n, it is considered that the master device 11 completes a polling. Besides, every time after the master device 11 completes the polling, the master device 11 starts to perform the next polling. Moreover, when the master device 11 completes the polling, the master device 11 and all the slave devices 12_1-12_n synchronously switch an operating frequency of wireless communication. In other words, when the master device 11 receives the acknowledgement messages from all the slave devices 12_1-12_n, the master device 11 can switch the operating frequency of wireless communication according to the frequency table previously stored by the master device 11. Or, if exceeding a second predetermined time (or referred to as a predetermined circular waiting time) after the master device 11 sends synchronous messages to all the slave devices 12_1-12_n (i.e., time for waiting the acknowledgement messages from the slave devices is times out), the master device 11 switches the operating frequency of wireless communication according to the frequency table previously stored by the master device 11. The predetermined circular waiting time is set up in order to allow the master device 11 and the slave devices 12_1-12_n to synchronously switch the operating frequency of wireless communication, and the predetermined circular waiting time can be fine tuned. Thus, the slave devices 12_1-12_n can estimate the time approximately spent by the master device 11 for performing each polling and synchronously switch the operating frequency of wireless communication at corresponding time points.

For example, in some implementation situations, one of the slave devices 12_1-12_n receives a synchronous message from the master device 11 and transmits an acknowledgement message to the master device 11 according to the received synchronous message, but the master device 11 does not receive this acknowledgement message due to some reasons (for example, deteriorated communication environment). The setting of the predetermined circular waiting time can prevent failure of the entire communication system 10 in such a situation. Namely, regardless of whether the master device 11 receives the acknowledgement messages from all the slave devices 12_1-12_n in the communication system 10, the master device 11 can switch the operating frequency of wireless communication once the master device 11 completes a polling. Additionally, because all the slave devices 12_1-12_n possess the same frequency table, they can synchronously switch the operating frequency of wireless communication and maintain their connections with the master device 11.

In step S206 of FIG. 2, when the system state of the master device 11 is the synchronous message preparation state, the master device 11 executes the synchronous message preparation procedure to prepare a synchronous message. In the present embodiment, the synchronous message at least includes a slave device number, and the slave device number is corresponding to one of the slave devices 12_1-12_n. Herein the slave device numbers may be pre-assigned to the slave devices 12_1-12_n by the master device 11 for identification purpose. Thus, the slave devices 12_1-12_n can respectively identify and receive the synchronous messages from the master device 11 according to the corresponding slave device numbers.

Figure 3:
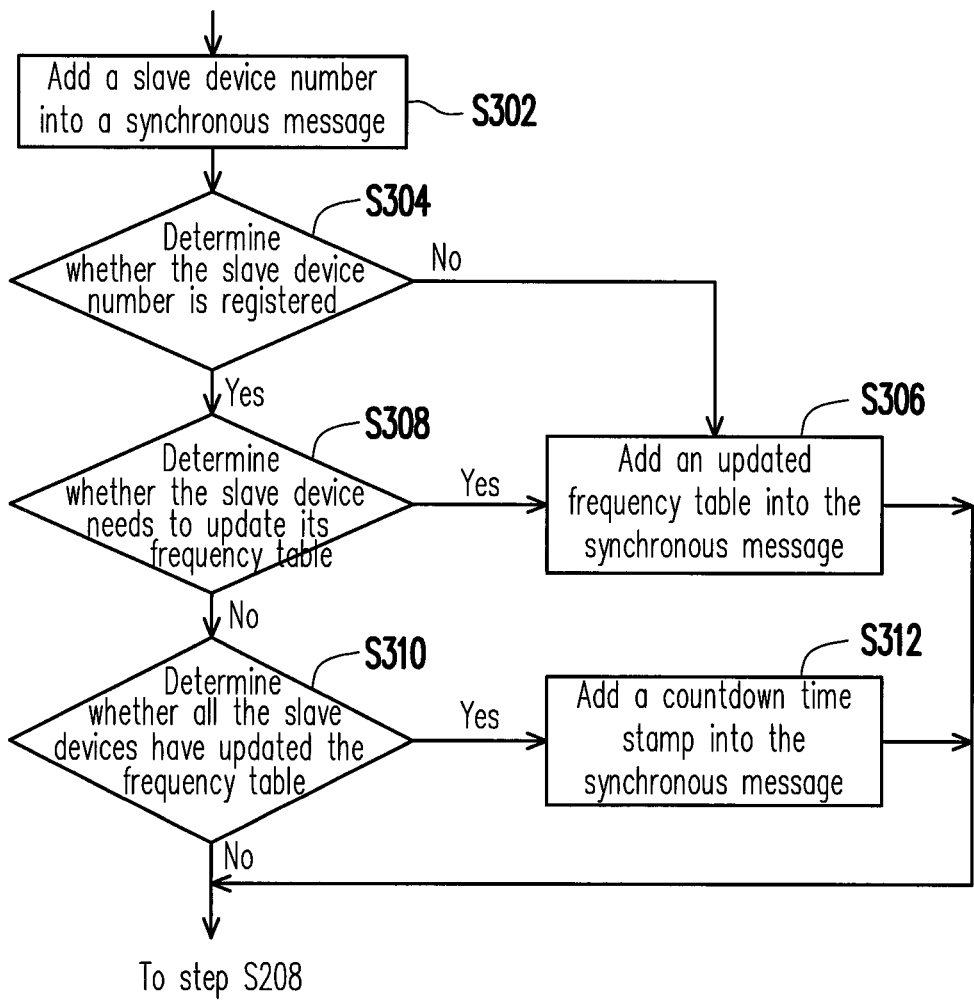
FIG. 3 is a flowchart of a synchronous message preparation procedure of a master device according to an embodiment of the invention.

FIG. 3 is a flowchart of a synchronous message preparation procedure according to an embodiment of the invention. Referring to FIG. 1, FIG. 2, and FIG. 3, the synchronous message preparation procedure starts from step S302. In step S302, the master device 11 can add the slave device number corresponding to the slave device (to which the currently prepared synchronous message is to be sent, for example, the slave device 12_1) into the synchronous message. Additionally, in an embodiment of the invention, the master device 11 may also add a message number into the synchronous message. Herein the message number is used for identifying the sequence of the synchronous messages sent to the slave devices 12_1-12_n. For example when the master device 11 does not receive an acknowledgement message corresponding to a previously sent synchronous message, the master device 11 can send a synchronous message with the same message number again. Thus, the slave devices 12_1-12_n can determine the transmission sequence of the synchronous message according to the message number in the synchronous message and determine whether to receive the synchronous message.

Next, in step S304, the master device 11 can determine whether the slave device number added into the synchronous message in step S302 is registered. For example, the master device 11 determines whether the slave device number is in a registered state through table lookup. Herein the meaning of "register" is similar to "connection", and the registered state is similar to a connected state. In the present embodiment, if the master device 11 determines that the slave device number is not registered yet (i.e., the slave device (for example, the slave device 12_1) corresponding to the slave device number may be a new slave device and is not connected to the master device 11 yet), in step S306, the master device 11 can add an updated frequency table or a currently used frequency table into the synchronous message carrying the unregistered slave device number, so that the slave device (i.e., an unregistered slave device, for example, the slave 12_1) corresponding to the slave number can synchronously switch the operating frequency with the master device 11 according to the frequency table in the synchronous message. Additionally, in step S306, the master device 11 can add a register flag indicating the register state of the slave device number into the synchronous message. For example, when the register flag is "0" (i.e., no), the slave device number is not registered, and when the register flag "1" (i.e., yes), the slave device number is registered.

In step S304, if the master device 11 determines that the slave device number has been registered, step S308 is executed after step S304, in which the master device 11 further determines whether the slave device (for example, the slave device 12_1) corresponding to the slave device number needs an updated frequency table. For example, when the master device 11 determines that the operating frequencies recorded in the currently used frequency table are not usable or do not offer good connection quality anymore, the master device 11 updates the frequency table, adds the updated frequency table into the synchronous message, and sends the synchronous message to the slave devices 12_1-12_n. The master device 11 can also add an updated frequency table flag into the synchronous message to notify the slave devices 12_1-12_n that the synchronous message received includes an updated frequency table. For example, when the slave device 12_1 receives a synchronous message carrying an updated frequency table, the slave device 12_1 sends an acknowledgement message carrying confirmation information to the master device 11. Thereafter, when the master device 11 receives the acknowledgement message carrying the confirmation information from the slave device 12_1, the master device 11 can record the frequency table update state of the slave device 12_1 into a frequency table update state table. Thus, in step S308, the master device 11 can update the state table by looking up the frequency table, so as to determine whether the slave device corresponding to the slave device number requires an updated frequency table. If the slave device requires the updated frequency table, step S306 is executed after step S308, in which the master device 11 adds the updated frequency table into the synchronous message to allow the slave device 12_1 to obtain the updated frequency table.

In addition, if the master device 11 determines in step S308 that the slave device 12_1 does not need to update the frequency table or require the updated frequency table, step S310 is executed after step S308, in which the master device 11 further determines whether all the slave devices 12_1-12_n have updated their frequency tables (i.e., have possessed the updated frequency table). If all the slave devices have updated their frequency tables (i.e., all the slave devices have received the updated frequency table), in step S312, the master device 11 can add a countdown time stamp into the synchronous message and start a countdown procedure. The countdown time stamp can be used for notifying the slave devices about the number of pollings to be performed before the updated frequency table is used. Besides, the countdown time stamp can be preset to any integer value (for example, 1-5), and the value thereof can be adjusted according to the actual requirement.

Additionally, in the present embodiment, if the countdown procedure is already started or the countdown time stamp is already added into the synchronous message previously, after every polling, the master device 11 can deduct 1 from the countdown time stamp added into the synchronous message of the previous polling and add the reduced countdown time stamp into the synchronous message of the current polling. When the value of the countdown time stamp becomes zero, the master device 11 and all the slave devices 12_1-12_n can synchronously start using the updated frequency table. In other words, because each polling is completed within a predetermined polling time (i.e., the first predetermined time), if a specific slave device (for example, the slave device 12_1) does not receive the synchronous message issued during a specific polling due to unsatisfactory network condition, the slave device (for example, the slave device 12_1) can still estimate the time for using the updated frequency table according to the predetermined polling time and the countdown time stamp in the previous received synchronous message.

If the master device 11 determines in step S310 that not all the slave devices 12_1-12_n have updated their frequency tables, the synchronous message preparation procedure is ended after step S310, and step S208 is executed again, as shown in FIG. 2. Besides, the synchronous message preparation procedure is also ended after steps S306 and S312, and step S208 is executed again, as shown in FIG. 2.

Figure 4:
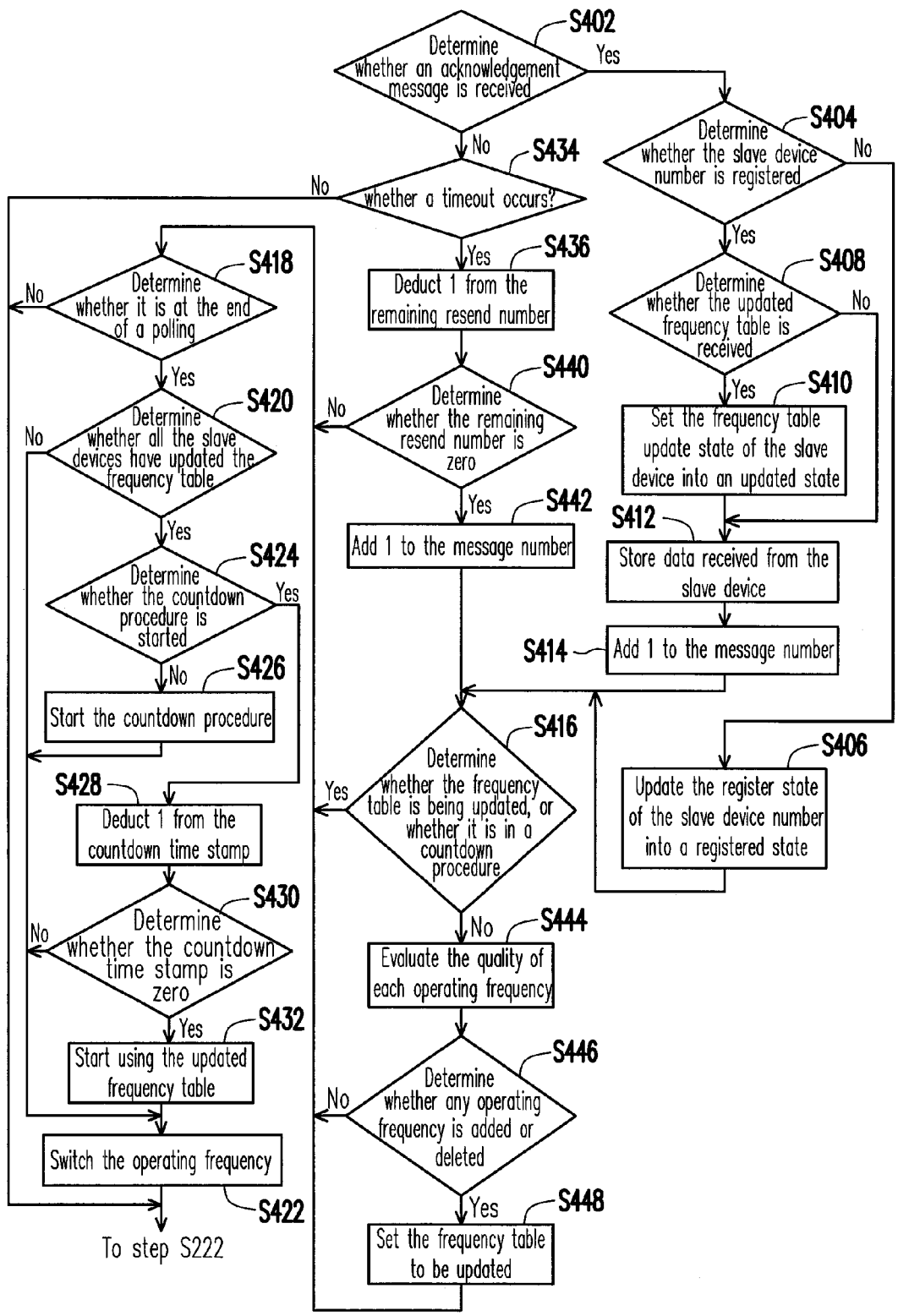
FIG. 4 is a flowchart of an acknowledgement message management procedure of a master device according to an embodiment of the invention.

Referring to FIG. 2 again, in step S220, when the system state of the master device 11 is the acknowledgement message waiting state, the master device 11 performs the acknowledgement message management procedure to wait for and receive acknowledgement messages from the slave devices. FIG. 4 is a flowchart of an acknowledgement message management procedure according to an embodiment of the invention. Herein the acknowledgement message management procedure is described with reference to the master device 11 and the slave device 12_1 illustrated in FIG. 1.

Referring to FIG. 1, FIG. 2, and FIG. 4, the acknowledgement message management procedure starts from step S402. In step S402, the master device 11 determines whether an acknowledgement message is received from the slave device 12_1. If an acknowledgement message is received from the slave device 12_1, step S404 is executed after step S402, in which the master device 11 determines whether the slave device number in the acknowledgement message is already registered. For example, the master device 11 determines whether the slave device issuing the acknowledgement message is registered according to a register flag in the acknowledgement message, or the master device 11 determines whether the slave device number is registered through table lookup. If the slave device number is not registered yet (i.e., the slave device is a new slave device), in step S406, the master device 11 updates the register state of the slave device number into "registered" in a register state table. For example, the master device 11 can update the register state of the slave device number to "1" (i.e., yes). On the other hand, if the slave device number is already registered, in step S408, the master device 11 determines whether the slave device (for example, the slave device 12_1) corresponding to the slave device number has received the updated frequency table. For example, the master device 11 checks whether the acknowledgement message sent by the slave device 12_1 carries any confirmation information, so as to determine whether the slave device 12_1 has received the updated frequency table. If the slave device 12_1 has received the updated frequency table, in step S410, the master device 11 sets the frequency table update state of the slave device 12_1 to "updated" in the frequency table update state table. In addition, the master device 11 can also determine the frequency table update states of the slave devices 12_1-12_n through table lookup. Moreover, if the master device 11 determines in step S408 that the slave device 12_1 does not receive the updated frequency table, step S412 is executed after step S408.

In step S412, the master device 11 can store data sent back by the slave device through the acknowledgement message. The data may be placed into the payload field in the acknowledgement message. Next, in step S414, the master device 11 can add 1 to the message number, so that the message number can be added into the synchronous message to be sent next. Thereafter, in step S416, the master device 11 determines whether to send the updated frequency table to the slave devices 12_1-12_n or whether it is currently in aforementioned countdown procedure during the current polling. If the master device 11 determines to send the updated frequency table to the slave devices 12_1-12_n or the master device 11 is currently in aforementioned countdown procedure, step S418 is executed after step S416, in which the master device 11 determines whether it is at the end of the current polling. For example, if the current acknowledgement message is received from the last slave device (for example, the slave device 12_n) and all the other slave devices have received the corresponding synchronous messages and send acknowledgement messages back to the master device 11, it is at the end of the current polling. If the master device 11 determines in step S418 that it is not at the end of the polling, step S222 is executed after step S418, as shown in FIG. 2.

On the other hand, if it is at the end of the current polling, in step S420, the master device 11 determines whether all the slave devices 12_1-12_n have updated their frequency tables. If not all the slave devices 12_1-12_n have updated their frequency tables (i.e., at least one of the slave devices 12_1-12_n has not received the updated frequency table) and the countdown procedure is started right away, the entire communication system may not be able to synchronize correctly. Thus, the master device 11 ends the current polling after step S420. Thereafter, in step S422, the master device 11 switches the operating frequency of wireless communication and executes step S222 in FIG. 2. If the master device 11 determines in step S420 that all the slave devices 12_1-12_n have updated their frequency tables, in step S424, the master device 11 determines whether the countdown procedure has started. For example, the countdown procedure is already started if the previously sent synchronous message or received acknowledgement message carries a countdown time stamp. If the countdown procedure is not started yet, in step S426, the master device 11 can start the countdown procedure and determine when to start using the updated frequency table based on the countdown procedure.

On the other hand, if the master device 11 determines in step S424 that the countdown procedure has started, step S428 is executed after step S424, in which the master device 11 deducts 1 from the countdown time stamp in the acknowledgement message and the countdown time stamp corresponding to the current countdown procedure. Besides, in step S430, the master device 11 determines whether the countdown time stamp is 0. If the countdown time stamp is 0, in step S432, the master device 11 starts using the updated frequency table. However, if it is determined in step S430 that the countdown time stamp is not 0, step S422 is executed after step S430.

If the master device 11 does not receive the acknowledgement message corresponding to the synchronous message in step S402, step S434 is executed after step S402, in which the master 11 determines whether its waiting time exceeds a predetermined acknowledgement waiting time (for example, 0.5 microsecond). If the waiting time of the master device 11 does not exceed the predetermined acknowledgement waiting time (i.e., no timeout occurs), step S222 is executed, as shown in FIG. 2. Contrarily, if the master device 11 determines that its waiting time has exceeded the predetermined acknowledgement waiting time in step S434, which means the previous synchronous message is not successfully sent to the slave device (for example, the slave device 12_1) due to unsatisfactory network condition or the acknowledgement message sent by the slave device is lost, in step S436, the master device 11 deducts 1 from the remaining resend number of a resend counter. Herein the remaining resend number of the resend counter is related to the number of times that the synchronous message can be resent. In step S440, the master device 11 can determine whether the remaining resend number of the resend counter is 0. If the remaining resend number of the resend counter is 0, the current operating frequency offers a very low quality and the master device 11 can give up resending the corresponding synchronous message. Thus, in step S442, the master device 11 gives up resending the corresponding synchronous message and adds 1 to the message number. Step S416 is executed after step S442. However, if it is determined in step S440 that the remaining resend number of the resend counter is not 0, step S418 is executed after step S440.

If the master device 11 determines in step S416 that the master device 11 needs not to send the updated frequency table to the slave devices 12_1-12_n or the master device 11 is not in the countdown procedure during the current polling, in step S444, the master device 11 evaluates the channel quality of each operating frequency in the frequency table. For example, the master device 11 evaluates the quality of its connection with each of the slave devices 12_1-12_n. Then, in step S446, the master device 11 determines whether to add new operating frequencies into the frequency table or delete operating frequencies from the frequency table according to the evaluation result obtained in step S444. If the master device 11 determines to add new operating frequencies into the frequency table or delete operating frequencies from the frequency table, in step S448, the master device 11 sets the frequency table to be updated and generates the updated frequency table after adding new operating frequencies into the frequency table or delete operating frequencies from the frequency table. Besides, if the master device 11 determines in step S446 that the operating frequencies in the frequency table need not to be added or deleted, step S418 is executed after step S446.

In an embodiment of the invention, when the master device 11 does not receive the acknowledgement message corresponding to a specific slave device number after a third predetermined time, the master device 11 can set the register state of the slave device number as "no". The third predetermined time can be set as a multiple of the first predetermined time. Namely, if a slave device (one of the slave devices 12_1-12_n) corresponding to the slave device number never responds during several pollings, it can be determined that the slave device (one of the slave devices 12_1-12_n) has lost its connection with the master device 11 (for example, the slave device has left the service range of the communication system 10 or the slave device encounters a power failure). Thus, when next time the slave device (one of the slave devices 12_1-12_n) establishes a connection with the master device 11, the slave device receives a synchronous message containing a slave device number in an unregistered state and registers with the master device 11 by using the slave device number in the unregistered state.

On the other hand, the system state of a slave device can be roughly categorized as a registered state or an unregistered state, and the slave device respectively perform corresponding actions in these two states.

Figure 5:
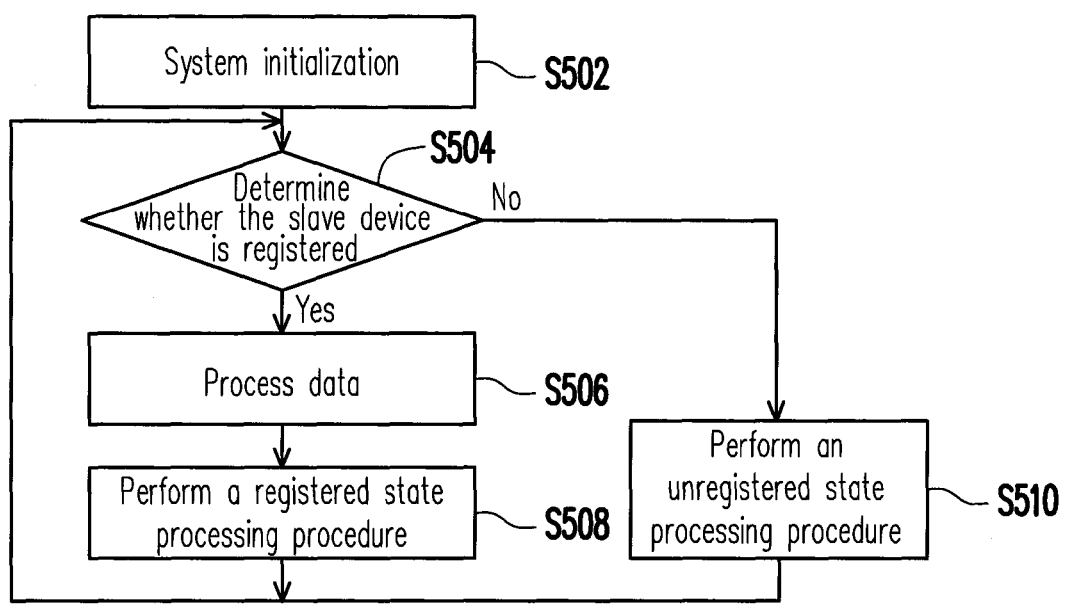
FIG. 5 is a schematic diagram illustrating the operations of a slave device according to an embodiment of the invention.

FIG. 5 is a diagram illustrating the operations of a slave device according to an embodiment of the invention. The operations of the slave device 12_1 in FIG. 1 will be described as an example.

Referring to FIG. 1 and FIG. 5, when the slave device 12_1 is turned on or reset, in step S502, the slave device 12_1 performs a system initialization procedure to set related system parameters (for example, network parameters). Then, in step S504, the slave device 12_1 can determine whether slave device 12_1 is in the registered state. For example, the slave device 12_1 can check and update its register state by checking the register flag in the previously received synchronous message. Or, the slave device 12_1 can also check its previously updated register state through table lookup. In other words, the slave device 12_1 is in the registered state if the slave device 12_1 has established a connection with the master device 11. If the slave device 12_1 is in the registered state, step S506 is executed after step S504, in which the slave device 12_1 processes data to be sent to the master device 11. Next, in step S508, the slave device 12_1 performs a registered state processing procedure. Additionally, if the slave device 12_1 determines in step S504 that slave device 12_1 is in the unregistered state, step S510 is executed after step S504, in which the slave device 12_1 performs an unregistered state processing procedure.

Figure 6:
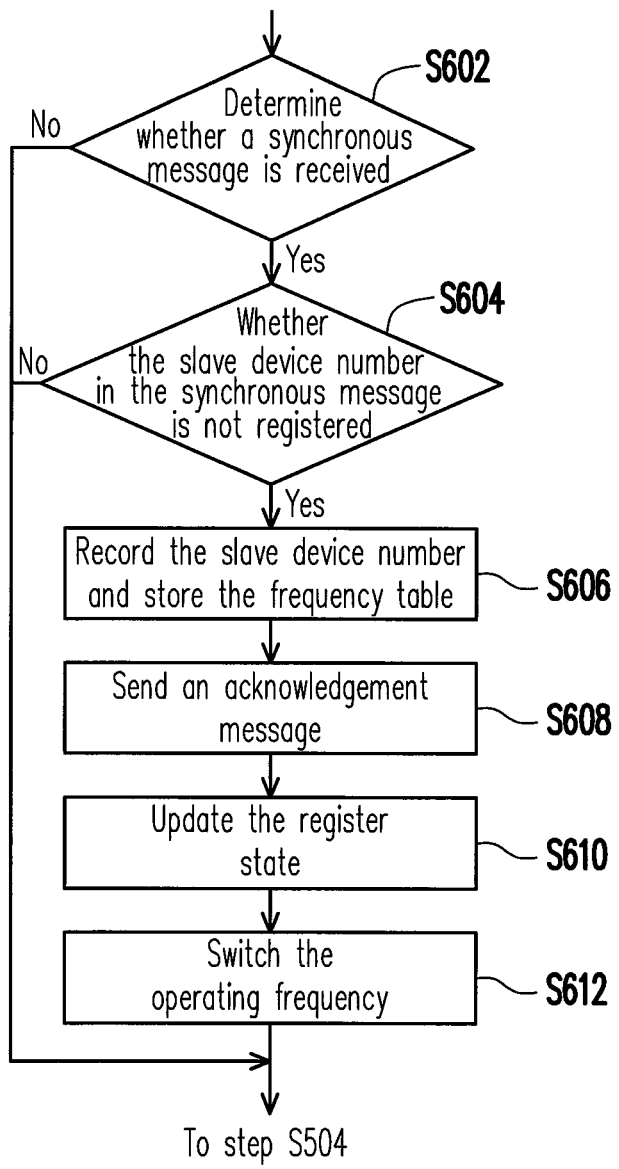
FIG. 6 is a flowchart of an unregistered state processing procedure of a slave device according to an embodiment of the invention.

FIG. 6 is a flowchart of an unregistered state processing procedure according to an embodiment of the invention. The unregistered state processing procedure will be described by referring to the slave device 12_1 illustrated in FIG. 1.

Referring to FIG. 6, the unregistered state processing procedure starts from step S602. In step S602, the slave device 12_1 determines whether a synchronous message is received. If the synchronous message is received, in step S604, the slave device 12_1 determines whether the slave device number in the synchronous message is not registered according to the register flag in the synchronous message or through another similar technique. If the slave device number in the synchronous message is not registered, in step S606, the slave device 12_1 records the slave device number and stores the frequency table carried by the synchronous message. Next, in step S608, the slave device 12_1 sends an acknowledgement message corresponding to the synchronous message to the master device 11. After that, in step S610, the slave device 12_1 updates the corresponding register state into the registered state to indicate that slave device 12_1 has established a connection with the master device 11. Besides, in step S612, the slave device 12_1 switches the operating frequency of wireless communication according to the frequency table slave device 12_1 stored and waits for asynchronous message sent by the master device 11 during the next polling. The unregistered state processing procedure is ended here, and step S504 in FIG. 5 is executed again. Additionally, if the slave device 12_1 determines that the synchronous message is not received in step S602 or the slave device number in the synchronous message is registered in step S604, the unregistered state processing procedure is also ended, and step S504 in FIG. 5 is executed again.

Figure 7:
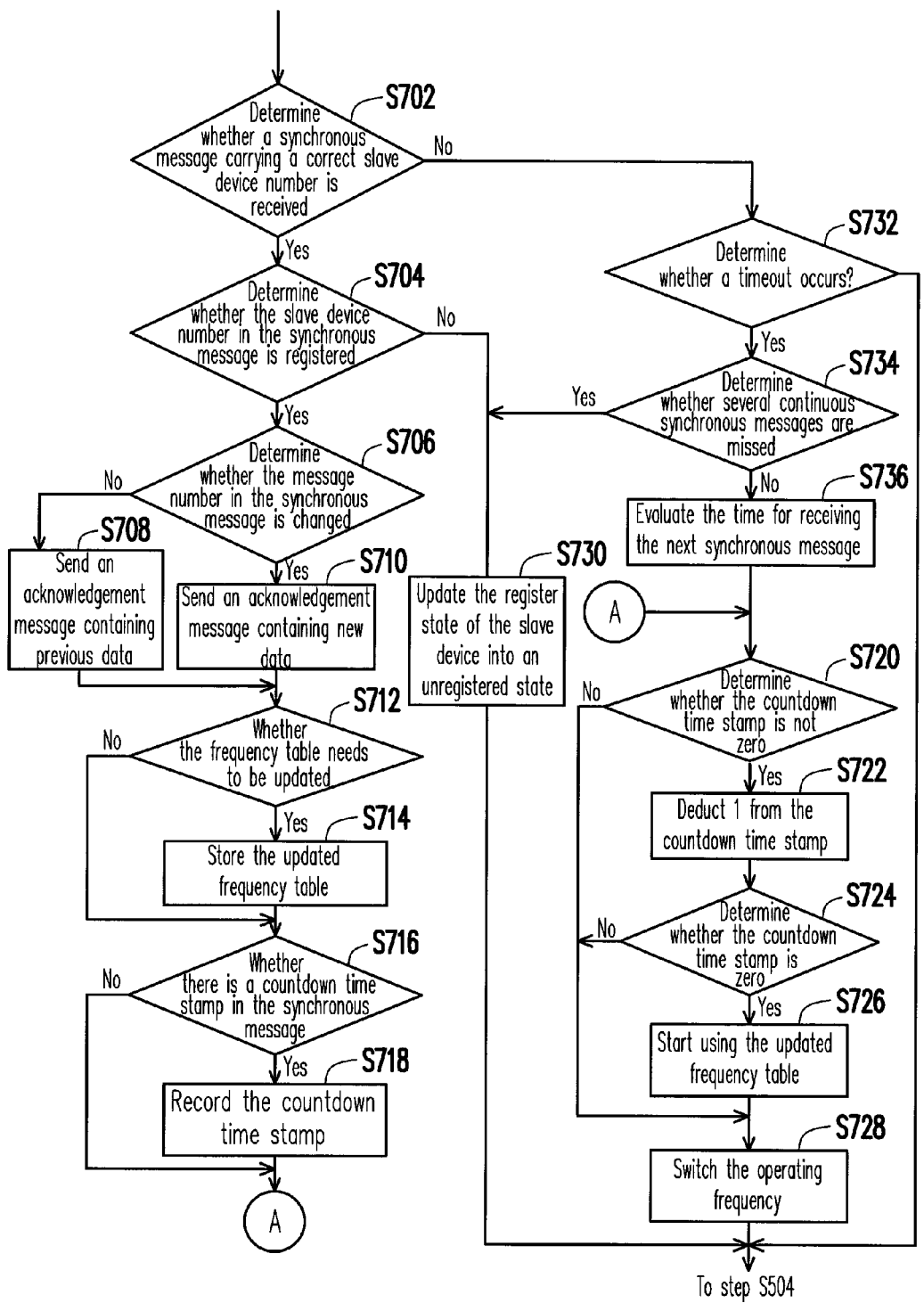
FIG. 7 is a flowchart of a registered state processing procedure of a slave device according to an embodiment of the invention.

FIG. 7 is a flowchart of a registered state processing procedure according to an embodiment of the invention. The registered state processing procedure is also described by referring to the slave device 12_1 illustrated in FIG. 1.

Referring to FIG. 7, the registered state processing procedure starts from step S702. In step S702, the slave device 12_1 determines whether a synchronous message carrying a correct slave device number is received. Herein the correct slave device number means the slave device number in the synchronous message is the same as the slave device number corresponding to the slave device 12_1. If the slave device 12_1 receives the synchronous message carrying the correct slave device number, step S704 is executed after step S702, in which the slave device 12_1 determines whether the slave device number in the synchronous message is registered. For example, the slave device 12_1 can determine whether the slave device number in the synchronous message is registered according to the register flag in the synchronous message. If the slave device number in the synchronous message is already registered, in step S706, the slave device 12_1 determines whether a message number in the synchronous message is changed. If the message number in the synchronous message is not changed (i.e., the synchronous message carries a message number same as the message number in the previously received synchronous message), the synchronous message is determined to be a synchronous message resent by the master device 11. Thus, in step S708, the slave device 12_1 resends the corresponding acknowledgement message. Herein the acknowledgement message carries data to be sent to the master device 11 last time. On the other hand, if the slave device 12_1 determines in step S706 that the message number in the synchronous message is changed (i.e., the synchronous message does not carry a message number same as the message number in the previously received synchronous message), in step S710, the slave device 12_1 can send the corresponding acknowledgement message. Herein the acknowledgement message carries new data to be sent to the master device 11.

Next, in step S712, the slave device 12_1 determines whether the synchronous message carries a frequency table or an updated frequency table. For example, the slave device 12_1 can determine whether to store the frequency table or the updated frequency table in the synchronous message according to a frequency table update flag in the synchronous message. If the synchronous message does not carry any frequency table or updated frequency table, step S716 is executed after step S712. On the other hand, if the synchronous message carries a frequency table or an updated frequency table or the slave device 12_1 needs to store the frequency table or updated frequency table in the synchronous message, in step S714, the slave device 12_1 stores the frequency table or the updated frequency table in the synchronous message.

Thereafter, in step S716, the slave device 12_1 determines whether the synchronous message carries a countdown time stamp. If the synchronous message does not carry any countdown time stamp, step S720 is executed after step S716. Contrarily, if the synchronous message carries a countdown time stamp, step S718 is executed after step S716, in which the slave device 12_1 records the countdown time stamp in the synchronous message. Besides, in step S720, the slave device 12_1 determines whether the countdown time stamp is not 0. If the countdown time stamp is 0, step S728 is executed after step S720. If the countdown time stamp is not 0, in step S722, the slave device 12_1 deducts 1 from the countdown time stamp. Besides, in step S724, the slave device 12_1 determines whether the countdown time stamp is 0 again. If the countdown time stamp is not 0, step S728 is executed after step S724.

If the countdown time stamp is 0, in step S726, the slave device 12_1 can start using the updated frequency table. The registered state processing procedure is ended here. Subsequently, after the second predetermined time elapses, in step S728, the slave device 12_1 switches the operating frequency of wireless communication, and Step S504 in FIG. 5 is executed next.

If the slave device 12_1 determines in step S704 that the slave device number in the synchronous message is not registered, step S730 is executed after step S704. Because the slave device 12_1 is in the registered state but the master device 11 determines that the slave device number is in the unregistered state, the slave device 12_1 updates its own register state into the unregistered state and waits to register (or establish connection) with the master device 11 again. The registered state processing procedure is ended here. Next, step S504 in FIG. 5 is executed after step S730.

If the slave device 12_1 does not receive the synchronous message carrying a correct slave device number in step S702, the slave device 12_1 continues to wait for the synchronous message carrying a correct slave device number. In step S732, the slave device 12_1 determines whether its waiting time exceeds a predetermined waiting time (i.e., whether a timeout occurs). If the waiting time of the slave device 12_1 does not exceed the predetermined waiting time (i.e., no timeout occurs), the registered state processing procedure is ended after step S732, and step S504 in FIG. 5 is executed next.

Moreover, if the slave device 12_1 determines in step S732 that its waiting time has exceeded the predetermined waiting time (i.e., a timeout occurs), in step S734, the slave device 12_1 determines whether several continuous synchronous messages are not received or missed. Herein the number of the continuous synchronous messages may be 2, 3, or 4. However, the number of the continuous synchronous messages can be adjusted according to the actual requirement. Additionally, in the present embodiment, aforementioned continuous synchronous messages refer to synchronous messages sent by the master device 11 to a slave device (for example, the slave device 12_1) during several continuous pollings.

If the slave device 12_1 does not receive several continuous synchronous messages in step S734, step S730 is executed after step S734. In addition, if the slave device 12_1 does not miss several continuous synchronous messages in step S734 (for example, during 3 pollings performed by the master device 11, the slave device 12_1 only misses the synchronous message sent by the master device 11 during the third polling and receives the synchronous messages sent during the previous two pollings), step S736 is executed after step S734, in which the slave device 12_1 can record that the current synchronous message is not received and start evaluating the time for receiving the synchronous message sent by the master device 11 during the next polling. Additionally, in steps S720-S728 after step S736, the slave device 12_1 can determine whether to start using the updated frequency table according to the previously received or set countdown time stamp and/or countdown procedure or directly switches the operating frequency of wireless communication, which will not be described herein. The registered state processing procedure is ended after steps S728 and S730.

Figure 8:
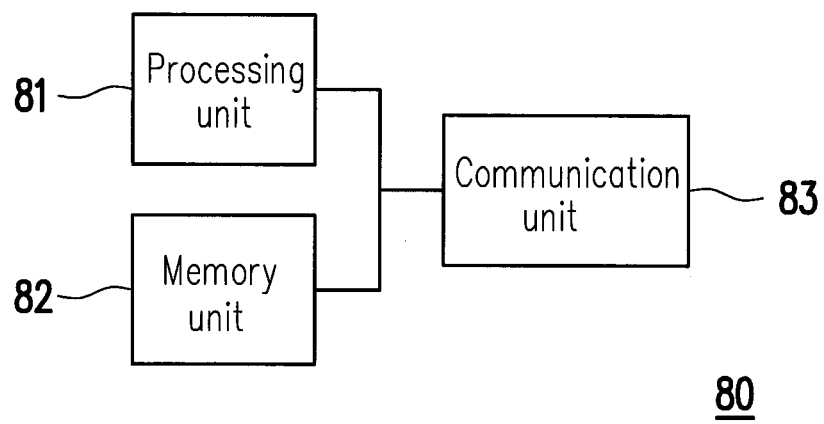
FIG. 8 is a functional block diagram of a master device according to an embodiment of the invention.

An embodiment of the invention provides a master device and a communication method adapted to the master device 11 illustrated in FIG. 1. FIG. 8 is a functional block diagram of a master device according to an embodiment of the invention. Referring to FIG. 8, the master device 80 includes a processing unit 81, a memory unit 82, and a communication unit 83. In the present embodiment, the processing unit 81 may be a micro-processor or a central processing unit (CPU). However, the invention is not limited thereto.

The memory unit 82 is coupled to the processing unit 81 and configured to store aforementioned frequency table, other types of tables, and related data. In the present embodiment, the memory unit 82 may be a non-volatile memory or a combination of different non-volatile memories. Besides, the memory unit 82 may also be a hard disc, a CD-ROM, an external storage device (for example, a memory card or a flash drive), or a combination of aforementioned storage media. However, the implementation of the memory unit 82 is not limited herein.

The communication unit 83 is coupled to the processing unit 81 and the memory unit 82 and configured to transmit and receive messages or packets. In the present embodiment, the communication unit 83 can be an antenna, a network interface card, a wireless network interface card, or a radio frequency circuit. However, the invention is not limited thereto.

Figure 9:
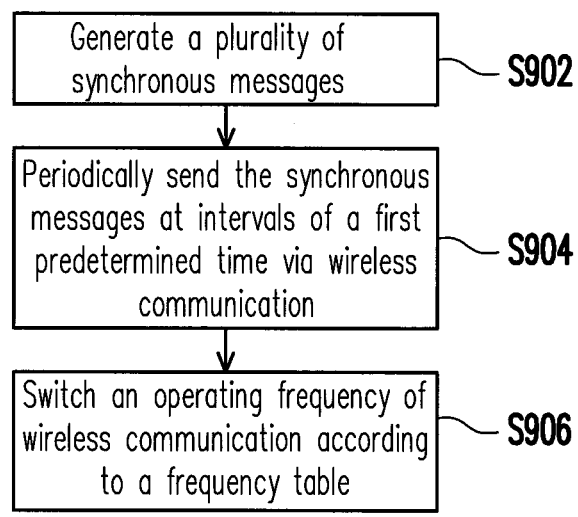
FIG. 9 is a flowchart of a communication method of a master device according to an embodiment of the invention.

FIG. 9 is a flowchart of a communication method of a master device according to an embodiment of the invention. Below, the communication method in FIG. 9 will be explained with reference to the master device illustrated in FIG. 8. Referring to FIG. 8 and FIG. 9, in step S902, the processing unit 81 can generate a plurality of synchronous messages. Then, in step S904, the communication unit 83 periodically sends the synchronous messages to the slave devices at intervals of a first predetermined time in wireless communication. Next, in step S906, the processing unit 81 switches an operating frequency of wireless communication according to a frequency table stored in the memory unit 82.

It should be noted that the communication method and the master device using the communication method have been described in detail in the embodiments illustrated in FIG. 1 to FIG. 7 therefore will not be described herein. Additionally, a functional block diagram of a slave device corresponding to the slave devices 12_1-12_n in FIG. 1 is similar to the functional block diagram of the master device 80 in FIG. 8 therefore will not be described herein. Moreover, the communication method of a slave device can also be understood by referring to the embodiments illustrated in FIG. 1 to FIG. 7 therefore will not be described herein.

As described above, in a communication system, a master device, and a communication method provided by embodiments of the invention, a plurality of synchronous messages is periodically sent to a plurality of slave devices to synchronously switch an operating frequency of wireless communication and allow each slave device to determine whether to update its own frequency table according to the received synchronous message. Additionally, each slave device can start using a new frequency table according to a countdown time stamp in the received synchronous message or through a countdown procedure. Thereby, operating frequency synchronization can be effectively accomplished between a master device and a plurality of slave devices even in a network environment with unsatisfactory communication quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A communication system, comprising:
a master device, periodically sending a plurality of synchronous messages at intervals of a first predetermined time; and
at least one slave device, respectively receiving the corresponding synchronous messages via wireless communication,
wherein the master device and the at least one slave device synchronously switch an operating frequency of wireless communication according to a frequency table,
wherein the synchronous messages respectively comprise a register state of the corresponding slave device number, and wherein the synchronous messages comprising the register state "no" further comprise the updated frequency table.

2. The communication system according to claim 1, wherein
after the at least one slave device respectively receive the corresponding synchronous message, the at least one slave device respectively send at least one acknowledgement message to the master device; and
when the master device receives the at least one acknowledgement message or a second predetermined time elapses after sending the synchronous messages, the master device switches the operating frequency of wireless communication according to the frequency table.

3. The communication system according to claim 1, wherein
the synchronous messages respectively comprise a slave device number corresponding to one of the at least one slave device,
wherein the at least one slave device respectively receives the corresponding synchronous messages according to the slave device numbers.

4. The communication system according to claim 1, wherein when a new slave device receives one of the synchronous messages comprising the register state "no", the new slave device sets wireless communication according to the slave device number and the frequency table in one of the synchronous message comprising the register state "no", and sends one of the acknowledgement messages comprising the slave device number to the master device via wireless communication to register the slave device number; and
when the master device receives the acknowledgement message corresponding to the slave device number, the master device sets the register state of the slave device number to "yes".

5. The communication system according to claim 1, wherein
when a third predetermined time elapses and the master device does not receive the acknowledgement message corresponding to the slave device number, the master device sets the register state of the slave device number to "no".

6. The communication system according to claim 1, wherein
when the master device determines that the frequency table is to be updated and at least one of the slave device does not update the frequency table, the master device adds the updated frequency table into the synchronous message corresponding to the at least one slave device with no updated frequency table; and
when the master device determines that the frequency table is to be updated and the frequency table of all of the at least one slave device is updated, the master device adds a countdown time stamp into each of the synchronous messages,
wherein when the synchronous message comprises the countdown time stamp is received by one of the at least one slave device, the slave device synchronizes the countdown time stamp and starts a countdown procedure; and
wherein the countdown time stamp decreases with the first predetermined time, and when the countdown time stamp or the countdown procedure reaches zero, the master device and the at least one slave device start using the updated frequency table.

7. The communication system according to claim 6, wherein
the master device determines whether to update the frequency table according to a connection quality between the master device and each of the at least one slave device.

8. A master device, adapted to a communication system, the master device comprising:
a processing unit, generating a plurality of synchronous messages;
a memory unit, coupled to the processing unit, and storing a frequency table;
a communication unit, coupled to the processing unit and the memory unit, and periodically sending the synchronous messages to at least one slave device of the communication system at intervals of a first predetermined time via wireless communication,
wherein the processing unit switches an operating frequency of wireless communication of the communication unit according to the frequency table,
wherein the synchronous messages respectively comprise a slave device number and a register state of the slave device number, and wherein the synchronous messages comprising the register state "no" further comprise the frequency table.

9. The master device according to claim 8, wherein
when the communication unit receives at least one acknowledgement message from the at least one slave device or a second predetermined time elapses after sending the synchronous messages, the processing unit switches the operating frequency of wireless communication of the communication unit.

10. The master device according to claim 8, wherein when the communication unit receives one of the acknowledgement messages comprising the slave device numbers in the register state "no", the processing unit sets the register state of the slave device number to "yes".

11. The master device according to claim 8, wherein when the processing unit determines that the frequency table is to be updated and the frequency table of the at least one slave device is not updated, the processing unit adds the updated frequency table into the synchronous message corresponding to the at least one slave device that does not update the frequency table and sends the synchronous message through the communication unit; and
when the processing unit determines that the frequency table is to be updated and the frequency table of all the at least one slave device is updated, the master device adds a countdown time stamp into each of the synchronous messages and sends the synchronous messages through the communication unit, wherein the countdown time stamp decreases along with the first predetermined time, and when the countdown time stamp reaches zero, the processing unit starts using the updated frequency table.

12. The master device according to claim 11, wherein the processing unit determines whether to update the frequency table according to a connection quality.

13. A communication method, adapted to a master device in a communication system, the communication method comprising:

generating a plurality of synchronous messages;

periodically sending the synchronous messages to at least one slave device of the communication system at intervals of a first predetermined time in wireless communication; and switching an operating frequency of wireless communication according to a frequency table, wherein when the frequency table is to be updated and the frequency table of the at least one slave device is not updated, adding the updated frequency table into the synchronous message corresponding to the at least one slave device that does not update the frequency table, and sending the synchronous messages; and when the frequency table is to be updated and the frequency table of all the at least one slave device is updated, adding a countdown time stamp into the synchronous messages, and sending the synchronous messages, wherein the countdown time stamp decreases along with the first predetermined time, and when the countdown time stamp reaches zero, starting using the updated frequency table.

14. The communication method according to claim 13, wherein the step of switching the operating frequency of wireless communication according to the frequency table further comprises:

when a plurality of acknowledgement messages is respectively received from the slave devices or a second predetermined time elapses after the synchronous messages are sent, switching the operating frequency of wireless communication according to the frequency table.

15. The communication method according to claim 13, wherein the synchronous messages respectively comprise a slave device number and a register state of the slave device number, and the synchronous messages comprising the register state "no" further comprise the frequency table.

16. The communication method according to claim 15, wherein when one of the at least one acknowledgement messages comprising the slave device number in the register state "no" is received, setting the register state of the slave device number to "yes".

17. The communication method according to claim 13 further comprising:

determining whether to update the frequency table according to a connection quality.

* * * * *